United States Patent [19]

Fisher et al.

[11] 3,858,412
[45] Jan. 7, 1975

[54] UNIVERSAL JOINT WITH BREATHER VALVE

[75] Inventors: Leslie George Fisher; Michael David Jones, both of Birmingham, England

[73] Assignee: GKN Transmission Limited, Erdington, Birmingham, England

[22] Filed: July 9, 1973

[21] Appl. No.: 377,254

[30] Foreign Application Priority Data

July 7, 1972 Great Britain .................... 31907/72

[52] U.S. Cl. .............................. 64/8, 64/21, 64/23, 137/525, 137/58

[58] Field of Search ......... 64/21, 17 R, 17 A, 8, 23, 64/32 F, 32 R; 137/58, 525

[56] References Cited

UNITED STATES PATENTS

| | | | |
|---|---|---|---|
| 1,483,865 | 2/1924 | Bowen | 64/17 R |
| 2,239,192 | 4/1941 | Cotting | 64/23 |
| 2,354,961 | 8/1944 | O'Donnell | 64/8 |
| 2,841,161 | 7/1958 | Lee | 137/58 |
| 3,028,924 | 4/1962 | Cooper | 64/8 |
| 3,055,390 | 9/1962 | Scheldorf | 137/525 |
| 3,403,696 | 10/1968 | Pynchon | 137/525 |

Primary Examiner—Samuel Scott
Assistant Examiner—Randall Heald
Attorney, Agent, or Firm—Spencer & Kaye

[57] ABSTRACT

A plunging constant velocity universal joint having seal means for retaining lubricant therein is provided with a valve to release air from and admit air to the interior of the joint during operation. The valve opens under centrifugal action when the joint is rotating and can also open when the joint is not rotating to release excess internal pressure.

11 Claims, 4 Drawing Figures

UNIVERSAL JOINT WITH BREATHER VALVE

BACKGROUND OF THE INVENTION

This invention relates to a universal joint of the kind comprising an outer member affording a chamber in which is received a part of an inner member and means for transmitting torque between the members so that relative rotation about a longitudinal axis of the joint is prevented, the members being relatively movable angularly about axes perpendicular to the longitudinal axis and relatively displaceable along the longitudinal axis.

When a universal joint of the kind referred to is in use, the chamber also contains lubricant and the volume of space available to be occupied by the lubricant varies as relative axial movement of the members occurs. Since the joint is required to be sealed against loss of lubricant and against ingress of water, axial movement tends to cause large changes in the pressure which subsists in the interior of the joint. Such large pressure variations present a serious problem since the establishment of a high pressure within the joint may rupture the seals and thus lead to loss of lubricant and ingress of foreign matter.

SUMMARY OF THE INVENTION

It is an object of the present invention to provide in a universal joint of the kind specified a valve which is adapted to release air from the interior of the joint when the pressure therein increases, which does not release lubricant from the interior of the joint and which does not admit water or other foreign matter.

According to the invention we provide in a universal joint of the kind referred to a normally closed valve having means for opening the valve under the action of centrifugal force when the joint rotates.

The valve would be arranged to open when the joint is rotating sufficiently rapidly to throw lubricant away from the axis of the joint towards the periphery of the chamber afforded by the outer member, and sufficiently to throw off the joint any water or other foreign matter present on the outside thereof which may otherwise be able to enter the joint through the open valve when any excess internal pressure has been relieved.

The valve opening may be at one end of a passageway, the other end of which communicates with the interior of the joint at or near to the axis of the joint. With this arrangement, lubricant will move away from the vicinity of said other end of the passageway when the joint is rotated sufficiently rapidly to cause the valve to open.

DETAILED DESCRIPTION

Figure 1:
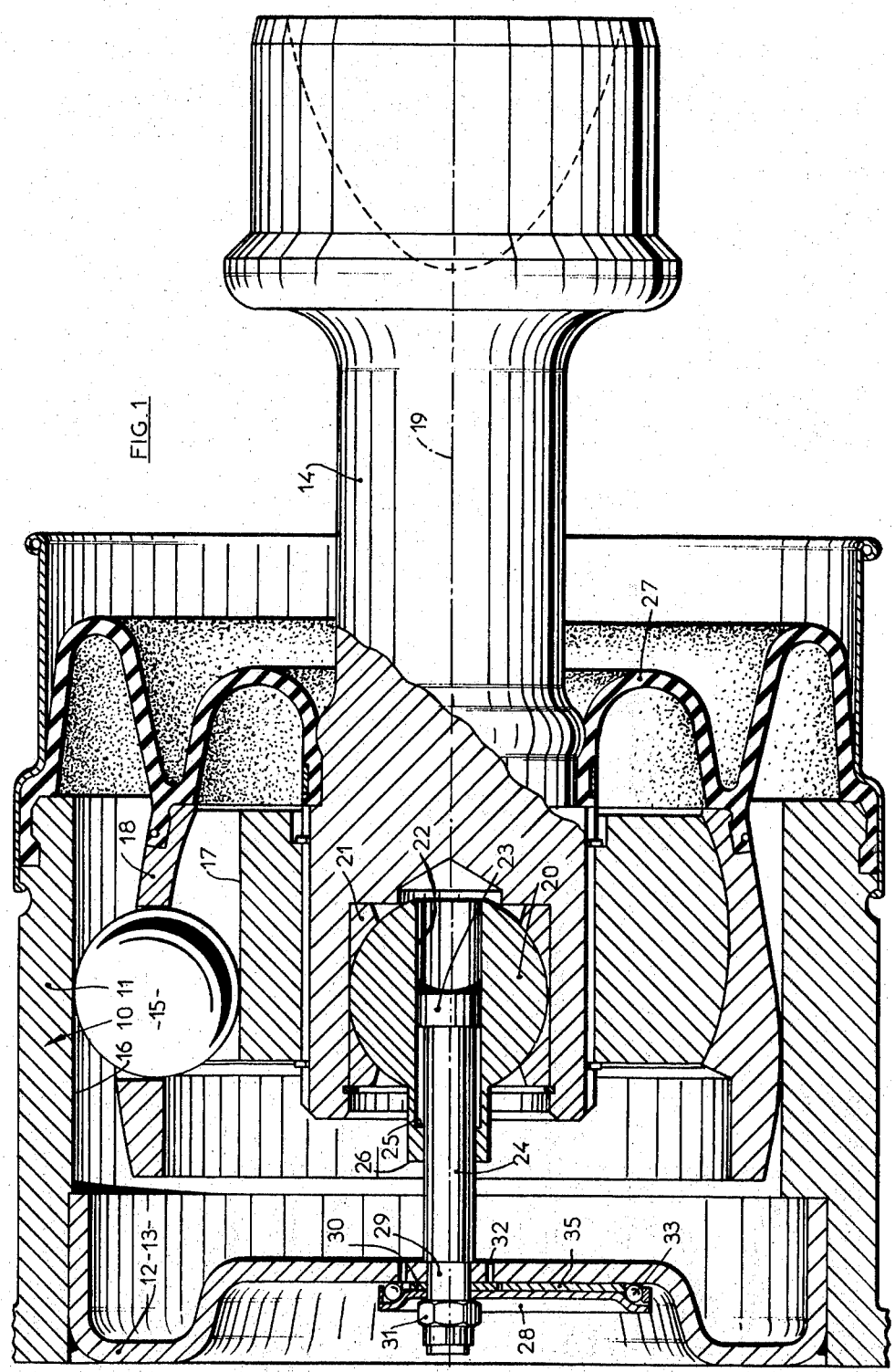
FIG. 1 shows a view in diametral cross-section of one example of universal joint in accordance with the invention.

The joint shown in FIG. 1 comprises an outer member 10 which includes a generally cylindrical peripheral wall 11 and an end wall 12 closing one end of the outer member. The outer member thus affords a chamber 13 in which is received an end portion of an inner member in the form of a shaft 14 and a plurality of torque-transmitting balls 15. A number of longitudinally extending grooves 16 is formed in the internal surface of the peripheral wall 11 and the same number of grooves 17 is formed in the radially outwardly presented surface of the inner member 14, these grooves co-operating in pairs to provide tracks for the balls 15. Each ball is located in an opening in a cage 18 also disposed within the chamber 13 and surrounding the end portion of the shaft.

The arrangement is such that the shaft 14 can articulate relative to the outer member 10 about axes which are perpendicular to the joint axis 19, and such that the shaft can be displaced along the axis 19 relative to the outer member. The balls 15, however, prevent rotation of the shaft 14 relative to the outer member about the axis 19.

To limit axial movement of the shaft 14 relative to the outer member 10, there is provided a location member 20 which has a part-spherical outer surface. The location member is received by a bearing 21 which presents a part-spherical internal surface, the bearing being secured within an axial bore formed in the end portion of the shaft 14. The location member is thus constrained to move axially with the shaft 14, but can move angularly relative thereto. A stepped bore 22 is formed in the location member and there is received in this bore the head 23 of a pin 24 which is attached at its opposite end to the end wall 12 of the outer member. Axial movement of the shaft 14 relative to the outer member 10 in a direction away from the end wall 112 is limited by engagement of the head 23 with a shoulder 25 presented internally of the bore 22. Axial movement of the shaft in the opposite direction is limited by engagement of an end face 26 of the location member with the end wall 12.

When the joint is in use, the chamber 13 contains lubricant and some air and is closed at the end opposite to the end wall 12 by an annular seal 27. Inner and outer peripheral portions of the seal are attached to the shaft 14 and outer member 10 respectively. The seal is formed of rubber or like flexible material so that is readily deforms to accommodate angular movement and axial displacement of the shaft relative to the outer member.

Axial displacement of the shaft 14 relative to the outer member 10 varies the volume of the space within the chamber 13 which is available to be occupied by the lubricant. Thus, such axial movement of the shaft is accompanied by pressure changes within the chamber. When the shaft 14 moves towards the end wall 12, the pressure is increased. There is a risk that the establishment of high pressures within the chamber 13 will rupture the seal 27, and we therefore provide a valve for releasing air from the chamber 13 when the pressure therein exceeds the ambient pressure.

Furthermore, when the shaft moves away from the end wall the pressure is decreased to such an extent that the seal may be at least partially collapsed by the atmospheric pressure. Repeated partial collapse of the seal damages same and may cause a considerable reduction in its working life. The valve is therefore preferably arranged to admit air to the chamber when this can be done without admitting water or other foreign matter.

The valve comprises a circular disc 28 which is mounted eccentrically with respect to the axis 19 on the outer face of the end wall 12. At a position offset from its centre, the disc is formed with an aperture through which a threaded shank of the pin 24 extends. A spacer 30 is also fitted on the shank 29 between the disc 28 and the end wall 12 to space the disc from the end wall. The disc is clamped against the spacer 30 by a nut 31 screwed onto the free end of the shank 29. A plurality of small openings 32 are drilled through the end wall 12, these openings being positioned near to the axis 19 and being spaced angularly from each other therearound. The openings 32 are spaced radially outwardly from the pin 24, but lie radially inwardly of the periphery of the disc 28. The openings 32 and the interspace between the disc 28 and the end wall 12 collectively form a passageway through which air can escape from the chamber 13.

For closing the passageway of the valve there is provided a closure member in the form of an O-ring 33 of rubber or like elastic material. Adjacent to its periphery, the disc 28 is flared away from the end wall 12 to provide a seat 34 for the O-ring. The O-ring normally engages with this seat and with the end wall 12 to close the passageway through the valve.

Figure 3:
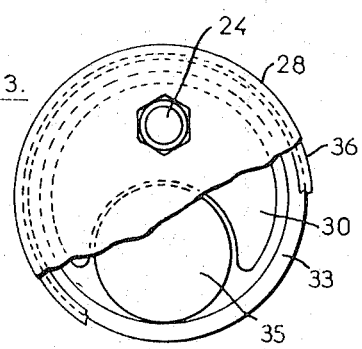
FIG. 3 is a fragmentary view in end elevation and on an enlarged scale of certain parts of the joint shown in FIG. 1.

For moving the O-ring 33 to open the valve, there is provided a control member in the form of a circular plate 35. The plate is disposed between the disc 28 and the end wall 12 and within the O-ring 33. The plate is a loose fit in the space between the disc 28 and end wall, having a thickness somewhat less than that of the spacer 30. The plate 35 is free to move under its own weight in a direction towards and away from the axis 19. Movement of the plate around the axis 19 is prevented by the spacer 30 which, as shown in FIG. 3, is provided with arms which extend around one half of the periphery of the plate 35.

Figure 2:
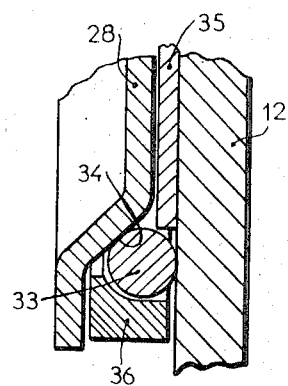
FIG. 2 is a fragmentary view on an enlarged scale and in diametral cross-section illustrating a detail of FIG. 1.

To limit radially outward displacement of the O-ring 33, there is provided a stop ring 36 which extends around the O-ring and is secured to the disc 28. As shown in FIG. 2, when the O-ring is engaged with the seat 34 and with the end wall 12, there is a small clearance gap between the O-ring and the stop ring.

When the joint is rotated about the axis 19, centrifugal actions tends to throw the plate 35 radially outwardly from the axis against a part of the O-ring 33. When a predetermined speed of rotation is reached, the O-ring is lifted off the seat 34 or out of engagement with the end wall 12 and at higher speeds may be pressed against the stop ring 36. Thus the passageway between the disc 28 and the end wall 12 is opened at the position of contact between the plate 35 and the O-ring.

When the joint is rotating about the axis 19, centrifugal action causes the lubricant present in the chamber 13 to be thrown away from the axis so that lubricant does not lie in the vicinity of the openings 32. Thus, when the valve is open, lubricant is not able to flow out of the chamber through the valve. It will also be noted that the passageway through which air can leave the chamber 13 extends radially away from the axis 19 at positions both upstream and downstream of the O-ring 33. Since the valve is open only when the joint is rotating, the risk of water or other foreign matter entering the chamber 13 is negligible since such foreign matter will be thrown radially away from the axis and will not be able to enter the passageway whilst the joint is rotating. Any foreign matter which is present between the disc 28 and the end wall 12 in the vicinity of the stop ring 36 when the joint is stationary will be thrown away from the O-ring when the joint begins to rotate.

It will be appreciated that, when the joint is rotating rapidly, the valve will remain open and air can flow into or out of the chamber 13 whenever the pressure therein falls below or rises above the ambient pressure respectively. Also, should the pressure within the joint rise for any reason such as axial movement of the joint when the joint is not rotating or is rotating only slowly, the O-ring 33 will be lifted off the seat 34 by the pressure from within, allowing the escess pressure to be relieved.

Figure 4:
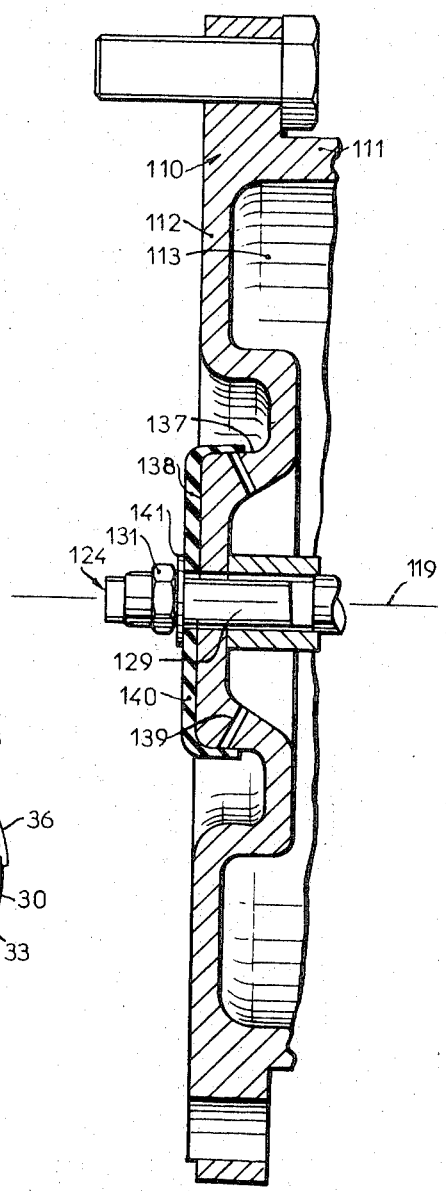
FIG. 4 shows a view in diametral cross-section of an outer member and valve assembly of a further example of a universal joint in accordance with the invention.

In FIG. 4 there is illustrated a modification of the joint shown in FIG. 1, the outer member and valve assembly only of this further example being shown in FIG. 4. Other parts of this second example of joint may be identical with parts already described with reference to FIG. 1.

The end wall 112 of the outer member 110 in FIG. 4 is formed at its axially outwardly presented side with an annular recess surrounding the axis 119 and positioned approximately mid-way between the axis and the peripheral wall 111. Thus at the radially inner boundary of the recess, the end wall presents a radially outwardly facing surface portion 137 which may be cylindrical or frustoconical, and between this radially presented surface portion and the axis, the end wall presents an axially facing surface portion 138.

A plurality of small openings 139 are drilled through the end wall 112 so that they open onto the radially presented surface portion 137. These openings extend in directions transverse to the axis 119 and collectively form a passageway through which air can be released from the chamber 113 to the atmosphere.

For closing the openings 139 when the joint is stationary, there is provided a closure member in the form of a cap of rubber or other resiliently deformable material, this cap overlying the radially presented surface portion 137 and the axially facing surface portion 138 of the end wall. The cap is clamped to the axially facing surface portion 138 by a washer 141 carried on the shank 129 of the pin 124 and retained in position by a nut 131.

It will be noted that the portion of the cap which overlies the radially presented surface portion 137 is thin, as compared with the remainder of the cap. This thin portion of the cap is sufficiently flexible to be lifted off the surface portion 137 by centrifugal action when the joint is rotating about the axis 119. Thus, when the joint is rotated, the valve is opened. The size and shape of the cap 140, when in an unstressed condition, are such that when the joint is stationary the cap normally seals the openings 139. However, should the pressure inside the joint rise above the ambient pressure for any reason, the said thin portion of the cap will be lifted away from the openings 139, allowing the excess pressure to be released before any damage to the seal 127 may arise.

Since the openings 139 extend in directions transverse to the axis 119 and the chamber 113 communicates with the openings at their radially inner ends, when the joint is rotating, foreign matter will not be able to pass through the openings into the joint. Furthermore, when the joint is rotating, lubricant will be thrown away from the axis and will not pass out of the joint through the openings.

We claim:

1. In a universal joint comprising an outer member affording a chamber in which is received a part of an inner member and means for transmitting torque between the members so that relative rotation about a longitudinal axis of the joint is prevented, the members being relatively movable angularly about axes perpendicular to the longitudinal axis and relatively displaceable along the longitudinal axis, the improvement comprising means defining a passageway into said chamber and movable closure means for normally closing the passageway and for opening the passageway under the action of centrifugal force when the joint rotates to flow both into and out of the chamber.

2. In a universal joint comprising an outer member affording a chamber in which is received a part of an inner member and means for transmitting torque between the members so that relative rotation about a longitudinal axis of the joint is prevented, the members being relatively movable angularly about axes perpendicular to the longitudinal axis and relatively displaceable along the longitudinal axis, the improvement comprising a valve opening offset from the longitudinal axis of the joint and communicating with said chamber, a closure element mounted for movement transversely of said axis between a closed position and an open position with respect to the valve opening and means biasing the closure element towards its closed position, the open position of the valve element being a radially outer position whereby the closure element tends to be moved to its open position by centrifugal force when the joint is rotated.

3. The improvement according to claim 1 wherein the joint has a longitudinal axis about which said outer member rotates in use, the outer member includes a peripheral wall defining a peripheral boundary of said chamber and the passageway communicates with said chamber at a position nearer to said axis than to said peripheral boundary.

4. The improvement according to claim 3 wherein the passageway extends transversely of said longitudinal axis and a radially inner end of the passageway communicates directly with said chamber.

5. The improvement according to claim 1 further comprising a control member and wherein the joint has a longitudinal axis about which said outer member rotates in use, the centre of gravity of the control member is off-set from said axis, the control member is mounted for movement transversely of said axis, the control member is constrained to rotate about said axis with said outer member, the closure means comprises a closure element movable between a closed position and an open position with respect to said passageway, and the control member is operatively associated with the closure means for urging the closure means to its open position under centrifugal action when the joint is rotated about said axis.

6. The improvement according to claim 5 wherein the control member is disposed within said passageway.

7. The improvement according to claim 5 wherein the closure element is a ring mounted eccentrically with respect to said axis, the control member is disposed within the ring at the side thereof spaced furthest from the axis, said passageway extends transversely of said axis and the control member normally closes the radially outer end of the passageway.

8. The improvement according to claim 1 wherein said means defining the passageway includes structure defining a valve opening, and said closure means comprises a closure element which is resiliently biased in a direction inwardly of the chamber with respect to the passageway and into sealing engagement with said structure, whereby the closure element can be displaced out of sealing engagement with said structure by excess pressure within the chamber and alternatively by the action of centrifugal force when the joint rotates.

9. The improvement according to claim 1 wherein said outer member has an end wall, said passageway is formed in said end wall, said closure means comprises a closure element of resiliently deformable material, and the respective shapes of said end wall and closure element are complementary whereby the closure element normally closes the passageway.

10. The improvement according to claim 3 wherein said passageway communicates with said chamber at a position off-set from said axis.

11. The improvement according to claim 1 wherein the joint has a longitudinal axis about which said outer member rotates in use, said means defining the passageway includes structure defining a valve opening which faces radially outwardly of said axis and said closure means is situated at the radially outer side of and is biased towards said valve opening, whereby the closure member is urged away from the valve opening by centrifugal action when the joint rotates.

* * * * *

UNITED STATES PATENT OFFICE
CERTIFICATE OF CORRECTION

PATENT NO. : 3,858,412
DATED : January 7, 1975
INVENTOR(S) : Leslie George Fisher et al It is certified that error appears in the above-identified patent and that said Letters Patent are hereby corrected as shown below:

In the heading of the patent, under [73] Assignee:, change "Transmission" to --Transmissions--.

Column 2, line 47, change "is" to --it--.

Column 3, line 47, change "actions" to --action--.

Column 4, line 15, change "escess" to --excess--.

Signed and sealed this '0th day of June 1975.

(SEAL)
Attest:

RUTH C. MASON
Attesting Officer

C. MARSHALL DANN
Commissioner of Patents
and Trademarks